United States Patent [19]

Krohn

[11] 4,064,446
[45] Dec. 20, 1977

[54] DUPLICATING METHOD AND ARRANGEMENT

[75] Inventor: Holger Krohn, Lohr-Wombach, Germany

[73] Assignee: Indramat-Gesellschaft fur Industrie-Rationalisierung und Automatisierung, Lohr am Main, Germany

[21] Appl. No.: 729,145

[22] Filed: Oct. 4, 1976

Related U.S. Application Data

[63] Continuation of Ser. No. 433,980, Jan. 16, 1974, abandoned.

[30] Foreign Application Priority Data

Jan. 18, 1973 Germany .............................. 2302336

[51] Int. Cl.$^2$ .............................................. G05B 19/36
[52] U.S. Cl. ................................. 318/578; 90/13.5; 90/13.8
[58] Field of Search ............... 318/578, 571; 90/13.5, 90/13.8

[56] References Cited

U.S. PATENT DOCUMENTS

| | | | |
|---|---|---|---|
| 2,627,055 | 1/1953 | Calosi | 318/578 |
| 3,300,696 | 1/1967 | Fillmore et al. | 318/578 |
| 3,667,023 | 5/1972 | Sommeria | 318/578 |
| 3,707,662 | 12/1972 | Hoffman | 318/578 |
| 3,715,646 | 2/1973 | Wise | 318/578 X |
| 3,764,877 | 10/1973 | Meyer | 318/578 |

*Primary Examiner*—B. Dobeck
*Attorney, Agent, or Firm*—Michael J. Striker

[57] ABSTRACT

The movement of a template past a stylus is controlled by furnishing desired velocity signals to first and second motors driving the template along two mutually perpendicular axes. Two wheatstone bridge strain gauge arrangements, one for each axis, and energized by quadrature voltages furnish signals which are combined in a summing amplifier to yield a signal having an amplitude and angular deflection corresponding to that of the stylus. The signal is rectified yielding a signal corresponding to the amplitude of stylus deflection and is further used to synchronize a sawtooth wave generator in accordance with the angle of deflection. The sawtooth wave output and the amplitude signal output are compared and when equal set a monostable multivibrator which closes two switches each sampling the output of one of the quadrature voltage generators energizing the strain gauges. Each of the so sampled voltages is applied to a potentiometer the output of which controls a corresponding one of the drive motors for the template.

9 Claims, 4 Drawing Figures

DUPLICATING METHOD AND ARRANGEMENT

This is a continuation of application Ser. No. 433,980 filed Jan. 16, 1974 now abandoned.

BACKGROUND OF THE INVENTION

The present invention relates to a duplicating method and arrangement and, more specifically, in a duplicating machine such as a milling machine wherein the direction and amplitude of deflection of a stylus is evaluated to control the motion of the template with which the stylus is in contact.

Duplicating methods are known wherein function generators are used to convert the deflection of the stylus into desired voltage signals for two mutually perpendicular axes.

The proportional-integral characteristic of the control system is the basic assumption for maintaining a constant deflection. However, at low duplicating speed the integrating portion as well as the unavoidable dead times in the control elements and/or the mechanical transfer elements, cause difficulties in the form of square wave oscillations or complete failure to determine the direction of deflection. For control techniques such as the use of a differentiating circuit, changes in the adjustment of the control system with changes in the speed, or similar measures only yield limited improvement. Further, other systems are known in which the direction of deflection of the stylus is used to determine the desired velocity values. Errors in this type of system, resulting, for example, from friction effects, are decreased by furnishing, for each axis, a desired deflection signal and comparing these desired deflection signals to the actual deflection in each direction. The velocity signal is then modified to effect a correction in the corresponding direction. However, errors due to friction and manufacturing tolerances cause difficulties in the system which result in duplicating speeds which vary with the direction of movement (i.e., the speed along the path is not constant) and further cause the system to operate improperly below a certain operating speed.

SUMMARY OF THE INVENTION

It is an object of the present invention to furnish a method and arrangement in which duplicating can be carried out without the above-mentioned disadvantages of the conventional method and arrangement and wherein the speed along the path is constant in each operating phase of the stylus and even at the lowest operating speeds.

In accordance with the present invention, the above objectives are attained by causing the phase angle of a velocity vector to be set in accordance with the direction of deflection of the stylus and, further, the amplitude of deflection of the stylus is used to effect a rotation of the velocity vector in such a manner that the direction of motion is such to maintain a constant deflection of the stylus. Alternatively, rather than the actual amplitude of deflection of the stylus, the difference between a desired and an actual amplitude of deflection may be used.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
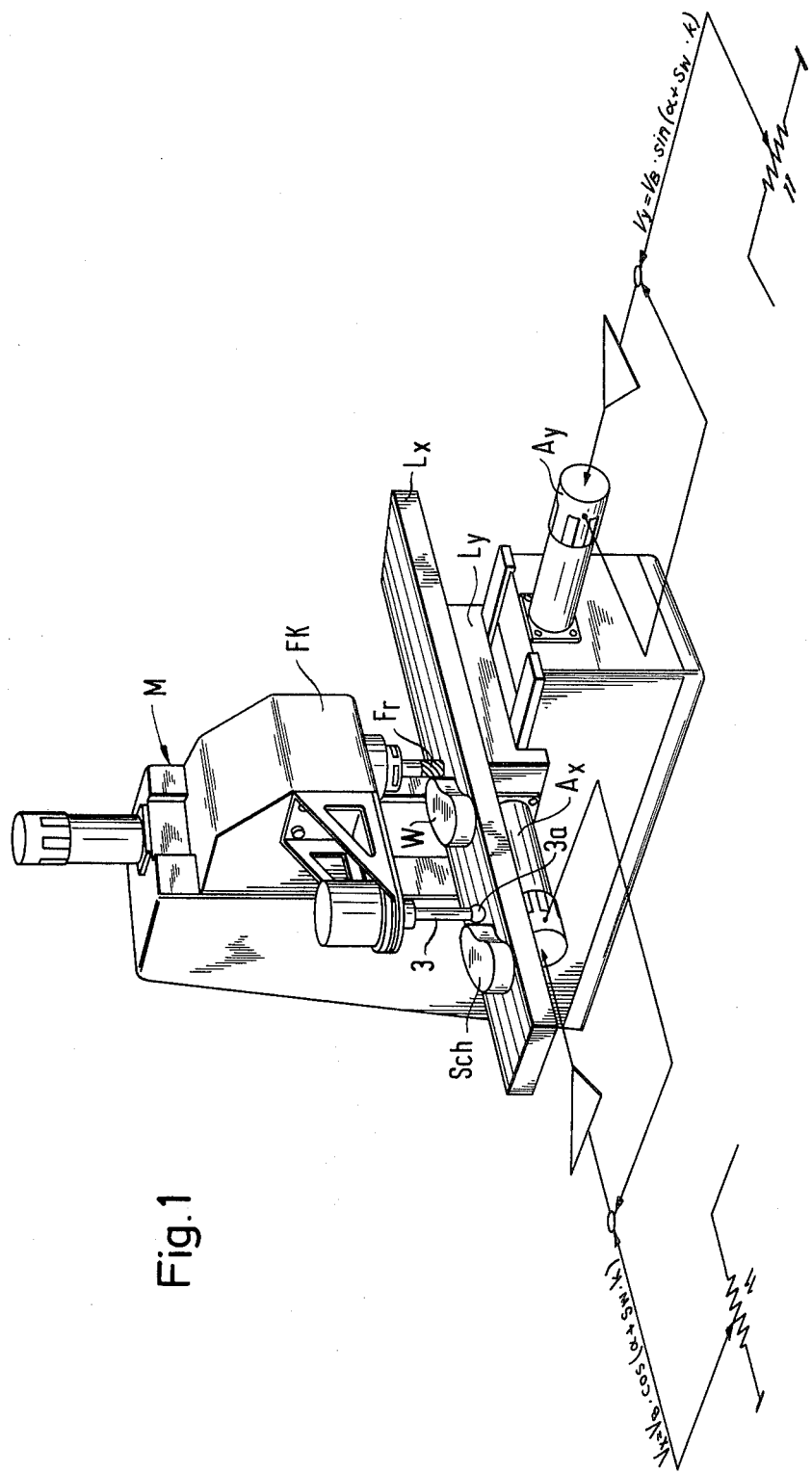
FIG. 1 is an overall view of a milling machine in which the present invention may be utilized.

The preferred embodiment of the present invention will now be described with reference to the drawing.

FIG. 1 shows a profiler or duplicating milling machine generally designated by the letter M. A template designated by the letters Sch and the workpiece W are both mounted on a carriage Lx which in turn is mounted on a saddle Ly. A drive Ax is used to move carriage Lx, while the saddle Ly is driven by a drive system Ay. Drives Ax and Ay are controlled by the output signals Vx, Vy of FIG. 2. Stylus 3 with tip 3a, milling head Fk with tool Fr all form a single unit. Milling head Fk may be movable in the vertical direction.

Figure 2:
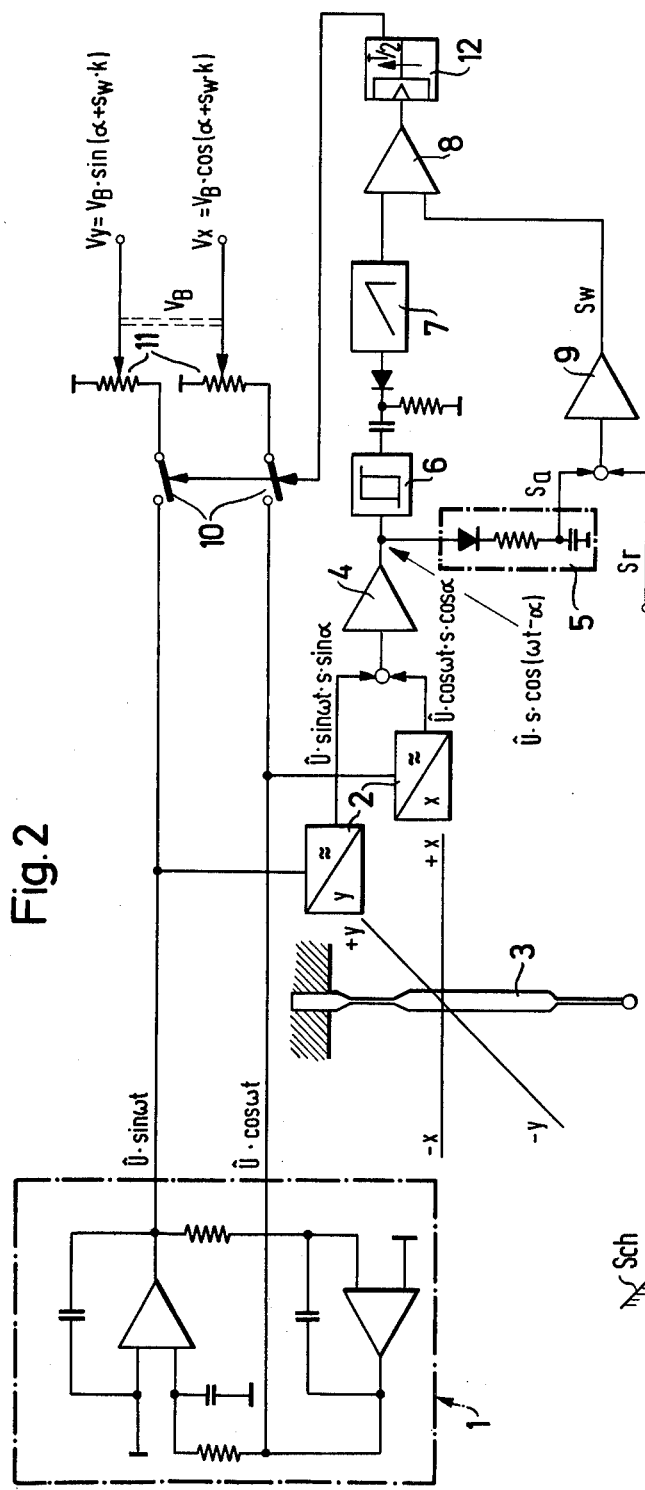
FIG. 2 is a schematic diagram of the control system of the present invention.

The system for furnishing the first and second desired velocity signals, namely signals Vx and Vy shown controlling drives Ax and Ay of FIG. 1, are shown in FIG. 2. Reference numeral 1 of FIG. 2 designates a sine-cosine generator which is used to energize the measuring circuits 2 which will be described in greater detail with reference to FIG. 4. These measuring circuits are used to measure the deflection(s) of the spring mounted stylus 3 in the x and y axis directions. A tip of stylus 3 is of course in mechanical contact with the template which is not shown in FIG. 2. As shown in FIG. 2, the measuring circuits 2 are energized by the sine-cosine generator in such a manner that the instantaneous value of the output signals for the two axes are as follows:

$$\text{Axis } X = \hat{u} \cdot \cos wt \cdot S \cdot \cos \alpha$$

$$\text{Axis } Y = \hat{u} \cdot \sin wt \cdot S \cdot \sin \alpha$$

where $\hat{u}$ is the amplitude of the applied voltage and $S$ is the deflection of the tip of the stylus.

The above signals are combined in summing amplifier 4. The output signals of summing amplifier 4 is thus:

$$A_t = \hat{u} \cdot S \cdot \cos(wt - \alpha)$$

It will be noted that the signal has an amplitude which is proportional to the deflection of the stylus and an angle whose phase relative to the cosine oscillation of generator 1 corresponds the direction of deflection of stylus 3. This signal is applied to a trigger stage 6, which in a preferred embodiment of the present invention is a bistable stage which changes state whenever the applied signal passes through a predetermined phase angle such as a zero phase angle. The resulting rectangular signal, following differentiation, is used to synchronize the means for furnishing a comparison signal, which, as shown in FIG. 2, is a sawtooth generator whose output voltage varies as a predetermined function of time. The output signal of summing amplifier 4 is further applied to a rectifier-filter stage 5 whose output is a signal corresponding to the actual deflection of stylus 3. This signal is designated by Sa in FIG. 2 and is compared to a signal Sr, namely a signal signifying the reference position of the stylus. The resulting difference after amplification in an amplifier 9 is applied to one input of comparator 8. The other input of comparator 8 receives the comparison signal namely the signal at the output of sawtooth generator 7. The output of comparator generator changes whenever the signal at the two inputs is equal.

A monostable multivibrator 12 is connected to the output of comparator 8. Monostable multivibrator 12 is switched to the unstable state by a determined edge of the signal at the output of comparator 8. That is, monostable multivibrator 12 is switched to the unstable state whenever the output of comparator 8 undergoes a transition from plus to minus (or, alternatively from minus to plus). Monostable multivibrator 12 remains in the unstable state for a predetermined time interval. In a preferred embodiment of the present invention, this predetermined time interval is substantially equal to one-half the period of the sine-cosine oscillation applied to the measuring circuit. While monostable multivibrator 12 is in the unstable state, it furnishes a signal to electronic switches 10 which closes the switches. These switches thus apply the instantaneous value of the output of the sine-cosine generator to respective voltage dividers 11. It is obvious that the so sampled instantaneous values of the outputs of the sine-cosine generator depend upon the relative phase angle of the output of comparator 8 to that of generator 1. The instantaneous values thus depend on the one hand on the relative phase angle between sawtooth generator 7 and generator 1, that is on the direction of deflection of the stylus, and on the other hand on the time instant at which the output of sawtooth generator 7 becomes equal to that of amplifier 9. The latter of course depends upon the actual deflection of the stylus or, alternatively, on the difference between the actual deflection of the stylus and a reference deflection. The resulting signals at the output of voltage divider 11 are thus the following:

$V_y = V_B \cdot \sin(\alpha + Sw \cdot K)$ $V_x = V_B \cdot \cos(\alpha + Sw \cdot K)$ As illustrated in FIG. 1, the signals $V_y$ and $V_x$ are, respectively, compared to the actual speeds of drives $A_x$ and $A_y$. The resulting error signals are used to regulate the speeds of the respective drives. The components $V = V_B \cdot \sin \alpha$ and $V_B \cdot \cos \alpha$ which were derived from the direction of deflection determine the basic direction along a curve. The additional phase rotation derived from an evaluation of the amplitude of deflection ($Sw \cdot K$) serves as a correction of the basic direction and causes the deflection of stylus 3 to remain constant. This correction by means of an additional phase rotation guarantees a velocity along the curve which is constant and independent of direction down to the smallest operating speeds which is made possible by the strictly proportional transfer characteristic of the control system.

Figure 3:
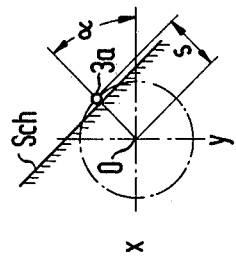
FIG. 3 is a diagram defining the amplitude and angle of deflection of the stylus.

FIG. 3 defines the angle of deflection $\alpha$ and the amplitude of deflection $S$ of stylus 3 relative to the $x$ and $y$ axes and point O which indicates the axis of the stylus. Specifically, the template is again indicated by letters Sch while the tip of the stylus is again indicated by 3a. The distance between the position 3a of the stylus along the template and point O is defined as S, while the angle of deflection $\alpha$ is the angle defined by the position of point 3a and the $x$ axis.

Figure 4:
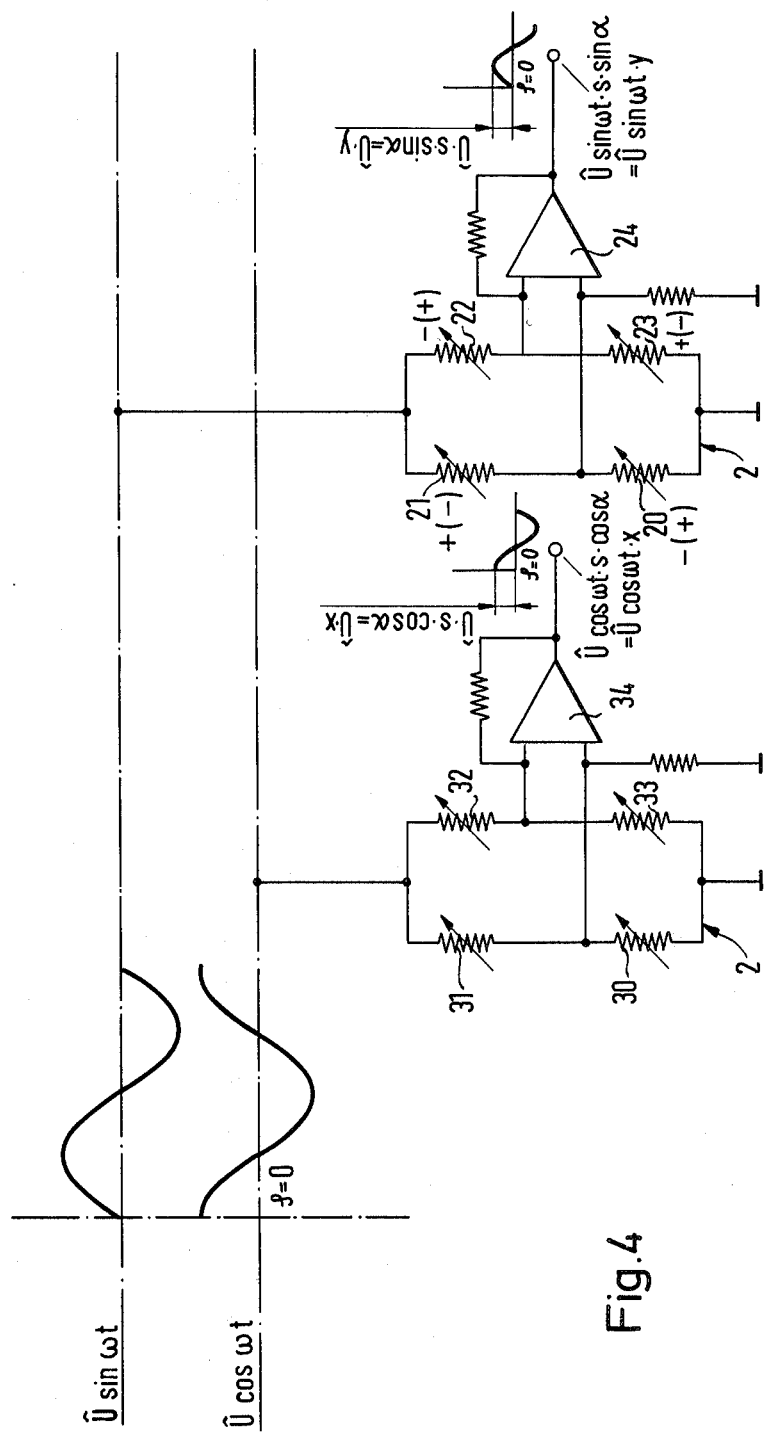
FIG. 4 is a schematic diagram of the measuring circuits used in FIG. 2.

Measuring circuits 2 shown in FIG. 2 are shown in more detail in FIG. 4. As shown in FIG. 4, the sine output of sine-cosine generator 1 is applied to a Wheatstone bridge having strain gauges 20, 21, 22 and 23. Of course, alternatively, inductive pickups could be used. It will be noted that strain gauges 21 and 23 are arranged to lie on the same measuring axis, that is a bending of the elastic member influence the strain gauges 21 and 23 (and equally strain gauges 20 and 22) in the same direction. The strain gauges are thus arranged in such a manner that their signals tend to reinforce each other thus furnishing a greater signal at the strain gauge output. The output signal of the strain gauges is further amplified in an operational amplifier 24. The signal at the output of the operational amplifier is the signal $\hat{U} \cdot \sin wt \cdot S \cdot \sin \alpha$. The second Wheatstone bridge shown in FIG. 4 is the bridge energized by the cosine output of sine-cosine generator 1. Its operation is identical to that described above and will not be repeated here. The output of the operational amplifier 34 which corresponds to operational amplifier 24 is $\hat{U} \cdot \cos wt \cdot S \cdot \cos \alpha$.

Many variations of the above described system are possible. For example it is possible to replace the sine-cosine generator by a sine generator and a subsequent phase rotation of 90° prior to application of the signal to one of the Wheatstone bridges described above. Further of course instead of a sawtooth generator any other function generator which furnishes a signal having a finite rise time may be used as a comparison signal generator.

However, the preferred embodiment of the present invention utilizes a sawtooth generator since its leading edge may encompass almost 360° thus covering the maximum possible deflection angle.

While the invention has been illustrated and described as embodied in generating both the basic and the additional phase angles for the desired velocity signals, it is not to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method for guiding a stylus along a template in a plane having a first axis, and a second axis perpendicular to said first axis, comprising, in combination, creating relative motion between said template and said stylus along said first and second axis in response to a first and second desired velocity signal respectively in such a manner that the amplitude of deflection of said stylus remains constant; and creating said first and second desired velocity signals as components along said first and second axis respectively of a velocity vector having a predetermined constant amplitude and having a phase angle corresponding to the direction of deflection of said stylus and varying also as a function of said amplitude of deflection, whereby the velocity in the direction of motion of said template relative to said stylus remains constant; wherein said step of creating said first and second desired velocity signals comprises the steps of furnishing a first AC voltage having an amplitude corresponding to the amplitude of deflection of said stylus along said first axis and a second AC voltage having an amplitude corresponding to the amplitude of deflection of said stylus along said second axis, adding said first AC voltage to said second AC voltage thereby creating a third AC voltage having an amplitude corresponding to said amplitude of said deflection of said stylus and a phase angle corresponding to said direction of deflection of said stylus, furnishing a comparison signal varying as a predetermined function of time, synchronizing said furnishing of said comparison signal to said third AC voltage, furnishing an amplitude signal corresponding to the amplitude of said third AC voltage, continuously comparing said amplitude signal to said comparison signal and furnishing a switching signal when said comparison signal has an amplitude corresponding to said amplitude signal, furnishing a first and second control voltage having a relative phase shift of 90°, and sampling said first and second control voltage in response to said switching signal, the so-sampled instantaneous value of said first and second control voltage constituting, respectively, said first and second desired velocity signals.

2. A method as set forth in claim 1, wherein said step of furnishing said switching signal comprises furnishing said switching signal for a predetermined time interval following said correspondence between said amplitude signal and said comparison signal.

3. A method as set forth in claim 1, wherein said predetermined function of time is a substantially linear variation with time.

4. Equipment for automatically guiding a stylus along a template in a plane having a first and second axis perpendicular to each other, comprising, in combination, first and second drive means for driving said template relative to said stylus along said first and second axis in response to said first and second desired velocity signal respectively in such a manner that the amplitude of deflection of said stylus remains constant; and means coupled to said stylus and connected to said first and second drive means for creating said first and second desired velocity signals as, respectively, the components along said first and second axis of a velocity vector having a predetermined constant amplitude and having a phase angle corresponding to the direction of deflection of said stylus relative to said first axis and varying also as a function of said amplitude of deflection, whereby the speed of motion of said template relative to said stylus remains constant, said means for creating said first and second desired velocity signals comprising means for furnishing a first and second control voltage having a phase shift relative to each other of 90°, first and second means for, respectively, creating a first signal indicative of said direction of deflection of said stylus and a second signal indicative of said amplitude of deflection, said first and second means comprising first and second measuring means operative under control of said first and second control voltage and responsive respectively to deflection of said stylus along said first and second axis, for furnishing, respectively, a first and second AC signal each having an amplitude corresponding to its respective deflection, and summing amplifier means connected to said first and second measuring means for furnishing a third AC signal having an amplitude corresponding to said amplitude of deflection of said stylus and a phase angle relative to said first control voltage corresponding to said direction of deflection, rectifier means connected to said amplifier means for furnishing a DC signal having an amplitude corresponding to the amplitude of said third AC signal, said DC signal constituting said second signal, and threshold circuit means connected to said summing amplifier means for furnishing a timing signal at a predetermined time instant in the cycle of said third AC signal, said timing signal constituting said first signal.

5. Equipment as set forth in claim 4, wherein said means for creating said first and second desired velocity signals further comprise means connected to said threshold circuit means for furnishing a comparison signal varying as a predetermined function of time in response to said timing signal; comparator means for receiving said timing signal and said second signal and furnishing a switching signal when said comparison signal is substantially equal to said second signal; a monostable multivibrator connected to said comparison means for maintaining said switching signal for a predetermined time interval; and switching means connected to the output of said monostable multivibrator for sampling said first and second control voltage in response to said timing signal, the instantaneous value of the so-sampled first and second control voltages constituting, respectively, said first and second desired velocity signals.

6. In an apparatus of the type comprised of an x-axis drive motor, a y-axis drive motor, a template, and a deflectable tracking stylus, wherein the template when bearing against the tracking stylus produces a stylus deflection of amount $s$ in a direction $\alpha$, an arrangement for causing the stylus to track the template with a desired predetermined amount of deflection during such tracking, the arrangement, comprising, in combination, means for sensing the stylus deflection of amount $s$ and direction $\alpha$; means for generating as a predetermined first function of the direction $\alpha$ and the difference $s_w$ between the actual amount of tracking stylus deflection and said predetermined desired amount an x-axis energizing signal $v_x = f_1(\alpha, s_w)$, and for generating as a predetermined second function of the direction $\alpha$ and the difference $s_w$ between the actual amount of tracking stylus deflection and said predetermined desired amount a y-axis energizing signal $v_y = f_2(\alpha, s_w)$, the relationship between $f_1(\alpha, s_2)$ and $f_2(\alpha, s_w)$ being such that $v_x^2 + v_y^2$ is a constant for any values of $\alpha$ and $s_w$; and means for applying the x-axis energizing signal to the x-axis drive motor and the y-axis energizing signal to the y-axis drive motor.

7. The apparatus defined in claim 6, wherein the means for generating the x-axis and y-axis energizing signals comprises means for generating an x-axis energizing signal $v_x = V_B \cdot \sin(\alpha + s_w \cdot k)$ and a y-axis energizing signal $v_y = V_B \cdot \cos(\alpha + s_w \cdot k)$, where $V$ and $k$ are constants, and wherein $v_x^2 + v_y^2$ is accordingly equal to the constant $V_B^2$ for any values of $\alpha$ and $s_w$.

8. In the operation of an apparatus of the type comprised of an x-axis drive motor, a y-axis drive motor, a template, and a deflectable tracking stylus, the template when bearing against the tracking stylus producing a stylus deflection of amount s in a direction $\alpha$, a method of causing the stylus to track the template with a desired predetermined amount of deflection during such tracking, the method comprising, in combination, the steps of sensing the stylus deflection of amount $s$ and direction $\alpha$; generating as a predetermined first function of the direction $\alpha$ and the difference $s_w$ between the actual amount of tracking stylus deflection and said predetermined desired amount an x-axis energizing signal $v_x = f_1(\alpha, s_w)$, and generating as a predetermined second function of the direction $\alpha$ and the difference $s_w$ between the actual amount of tracking stylus deflection and said predetermined desired amount a y-axis energizing signal $v_y = f_2(\alpha, s_w)$, the relationship between $f_1(\alpha, s_w)$ and $f_2(\alpha, s_w)$ being such that $v_x^2 + v_y^2$ is a constant for any values of $\alpha$ amd $s_w$; and applying the x-axis energizing signal to the x-axis drive motor and the y-axis energizing signal to the y-axis drive motor.

9. The method of claim 8, the step of generating the x-axis energizing signal comprising generating an x-axis energizing signal $v_x = V_B \cdot \sin(\alpha + s_w \cdot k)$, the step of generating the y-axis energizing signal comprising generating a y-axis energizing signal $v_y = V_B \cdot \cos(\alpha + s_w \cdot k)$, where $V_B$ and $k$ are constants, with $v_x^2 + v_y^2$ accordingly being equal to the constant $V_B^2$ for any values of $\alpha$ and $s_w$.

* * * * *